Sept. 27, 1949.  R. A. FENDER  2,483,269
FIELD BOX
Filed June 24, 1946  2 Sheets-Sheet 1
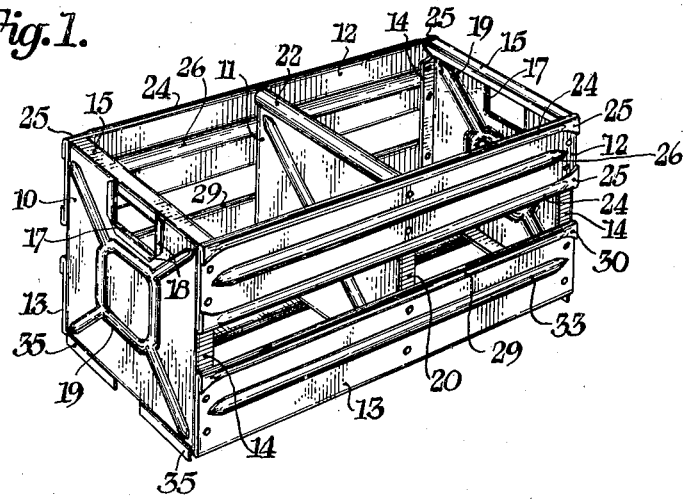
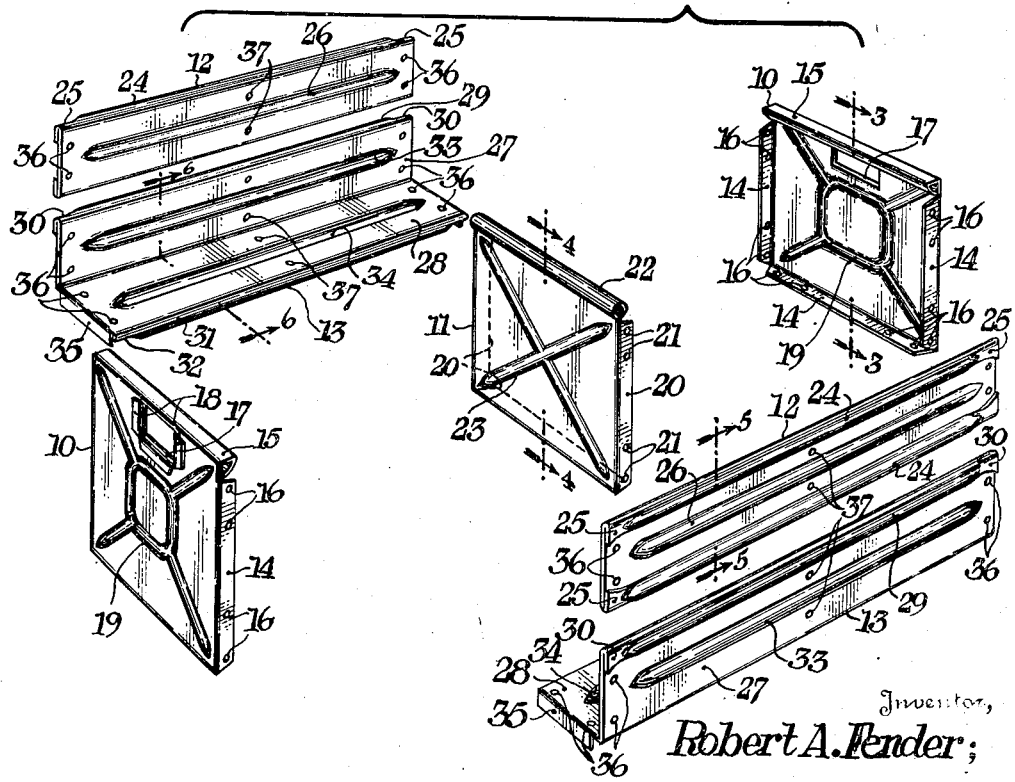

Sept. 27, 1949.   R. A. FENDER   2,483,269
FIELD BOX

Filed June 24, 1946   2 Sheets-Sheet 2

Inventor,
Robert A. Fender;
Attorney.

Patented Sept. 27, 1949

2,483,269

UNITED STATES PATENT OFFICE 2,483,269

FIELD BOX

Robert A. Fender, Orlando, Fla., assignor to American Machinery Corporation, Orlando, Fla., a corporation of Florida Application June 24, 1946, Serial No. 678,901

2 Claims. (Cl. 220—4)

This invention relates to field boxes and more particularly to field boxes composed of prefabricated, indestructible elements that may be employed as replacements for repairing standard wooden boxes or that may be assembled to form an indestructible field box.

The term "field box" is used generally to describe a container into which agricultural products such as apples, citrus fruit, tomatoes, potatoes and other fruits and vegetables are placed as they are gathered in the field to facilitate transportation to the packing plant. Existing types of field boxes are usually made of wood because of low initial cost and consist of two end members approximately one inch in thickness and having suitable hand openings, to facilitate handling, cut therein and joined by a number of slats nailed to their side and bottom edges to form an open-top box. These boxes are provided in two sizes and the larger boxes are provided with a center partition member, similar to the end members, to strengthen the box and to divide the box into two compartments so that the produce may be separated into two lots. The side and bottom members are usually about one-half the thickness of the end members and are secured to the end members by thin metal strips wound completely around the box outside the side and bottom slats and concentric with the end and center members, and nails are driven through the straps and the slats into the end and center members.

The rough handling to which field boxes are subjected, such as dropping them from trucks and the like, causes considerable breakage, particularly to the slats on the sides and bottom. The upper side slats are most frequently broken and these breaks produce ragged splintered surfaces and edges which cause considerable damage to the produce contained therein. While good wooden materials were plentiful and cheap, this type of box was acceptable even though it had an exceedingly short life and required frequent repairs. The situation has now changed, however, due to the scarcity of lumber, the poor quality of that which is available, and the highly increased cost of all lumber so that such a field box now proves decidedly inefficient and expensive.

Having in mind the defects of the prior art devices, it is an object of this invention to provide a field box formed of prefabricated members that are relatively indestructible and will not damage the produce packed in the box, and that has a relatively low initial cost with substantially no maintenance cost. It is contemplated that the individual members may be employed as replacements in repairing existing boxes.

The foregoing objects and others ancillary thereto are preferably accomplished, according to a preferred embodiment of the invention, by the provision of a field box composed of separate elements that are formed of a relatively indestructible material into shapes and sizes approximating their wooden counterparts. Specifically, the individual elements of the box are formed of sheet steel into members of essentially the same size and shape as the wooden members and are so designed as to be interchangeable therewith. The exposed edges of the metal members are rolled so as to present smooth contact surfaces as well as to increase rigidity and to present essentially the same thickness as the wooden members.

In addition, stiffening ribs are formed in the members to further strengthen them and these ribs may also be of approximately the same depth as the thickness of the wooden members. The rolled edges and the stiffening ribs in the slat elements are flattened at their ends to eliminate sharp corners and to facilitate strapping and nailing. The members are formed of very light sheet metal so that their weight is no greater than the original wooden members, and the material is sufficiently thin to permit a nail to be driven therethrough. However, the finished members are provided with holes to facilitate this operation and also to permit their assembly with other metal members by means of rivets. The end members are preferably provided with hand holes, and the lower side members are preferably formed with the bottom members in an angular shape which adds considerable structural strength to the assembly.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout, and in which:

Fig. 1 is a view in perspective of a field box formed of individual prefabricated, indestructible members;

Fig. 2 is an exploded view in perspective of the field box shown in Fig. 1;

Figure 3:
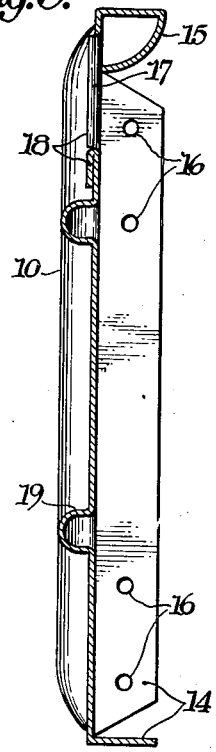
Fig. 3 is a cross sectional view taken on line 3—3 of Fig. 2.
Figure 4:
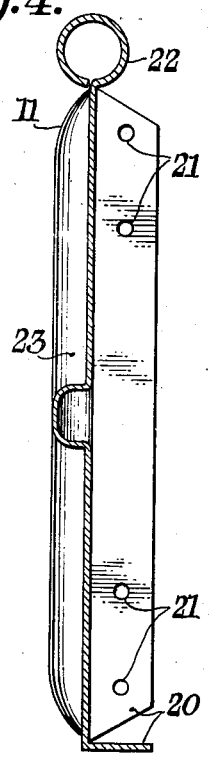
Fig. 4 is a cross sectional view taken on line 4—4 of Fig. 2.
Figure 5:
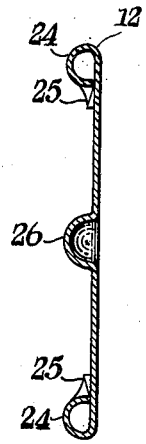
Fig. 5 is a cross sectional view taken on line 5—5 of Fig. 2.
Figure 6:
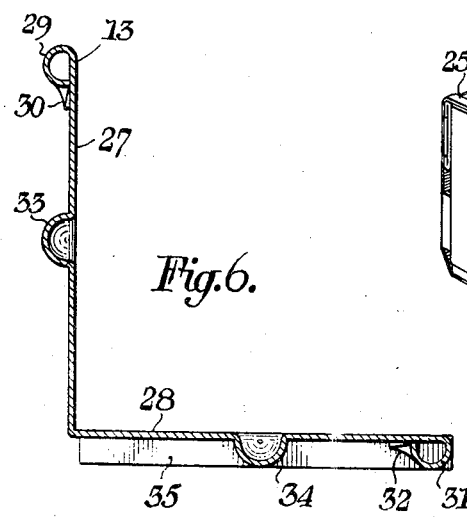
Fig. 6 is a cross sectional view taken on line 6—6 of Fig. 2.

A field box, to overcome the defects hereinbefore enumerated, should have the totally distinct characteristics comprising individual parts that are prefabricated from an indestructible material and that are provided in sizes and dimensions that permit their substitution for their wooden counterparts on existing field boxes. Accordingly, a preferred embodiment of the invention, referring to Fig. 1 of the drawing, is constituted by a field box composed of end members 10, a center partition member 11, side slats 12 and members 13 combining bottom and lower side slats. These elements are preferably composed of thin sheet metal, however, in actual practice they are formed of sheet steel, but it is contemplated that they may be formed of any strong, indestructible material such as some of the new thermo plastics.

The end members 10, as better shown in Figs. 2 and 3, have inturned flanges 14 around their bottom and side edges and a rolled flange 15 across its top edge. The inturned flanges 14 are provided with small holes 16 to accommodate nails or rivets. Hand holes 17 are cut in the tops of the end members 10 and their edges 18 are turned back to eliminate any sharp cutting edges. The holes 17 are positioned adjacent the top rolled edges 15 which form hand grips. Stiffening ribs 19 are formed in the surface of the end members 10 in the shape of a square with radiating ribs extending from its corners. The area within the square provides a protected surface for the application of the owner's name or identifying mark.

The center partition members 11 are similar to the end members 10 in that they have flanges 20, with nail holes 21 therein, extending from the side and bottom edges and a rolled flange 22 across its top edge. The center member 11 has stiffening ribs 23 extending diagonally between its corners in a cross formation.

The slat members are produced in two formations, one a straight slat member 12 which is designed for use primarily as the upper side member, and the other, an L-shaped member 13, that is adapted to form both a lower side member and a bottom member. Of course, it will be understood that in repairing a wooden field box or in assembling a new box, that the single slat member 12 may be employed as either a lower side slat or even a bottom slat. The slat member 12 comprises a strip having its longitudinal edges formed over into rolls 24, the ends 25 of which are flattened to eliminate protruding corners and to accommodate a binding strip if one is used. The slat 12 is further stiffened by a centrally disposed, longitudinally extending rib 26 that terminates short of its ends for the same reason that the rolls 24 are flattened. The bottom and lower side member 13 is composed of a wider strip that is formed in an angle so that one flange 27 forms a lower side slat, whereas, the other flange 28 forms a bottom slat. The formation of these two slats 27 and 28 as a unitary member 13 adds considerable rigidity to the assembled structure.

The upper edge of the side flange 27 is formed over into a roll 29, having its ends 30 flattened, and the free edge of the flange 28 has its edge formed over into a roll 31 with its ends 32 flattened. Stiffening ribs 33 and 34 are centrally disposed longitudinally of the two flanges 27 and 28 respectively. Similar to the ridge 26 in the slat 12, the ridges 33 and 34 terminate short of the end of the slat members. The ends of the bottom flanges 28 are turned over to form right angle flanges 35 to increase lateral rigidity. Each of the slat members 12 and 13 are provided with nail holes 36 in their ends and holes 37 in their central portions to correspond respectively with the holes 16 in the flanges 14 of the end members 10 and the holes 21 in the flanges 20 of the center partitions 11. By means of these holes, the slat members may be nailed to the wooden boxes or they may be joined with the metal members by rivets.

Figure 7:
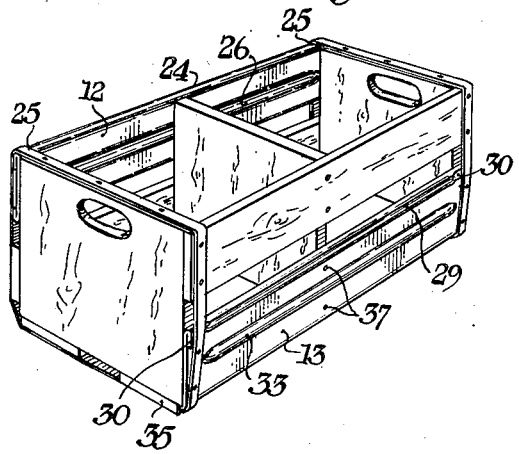
Fig. 7 is a view in perspective of a standard wooden field box which has been repaired by the replacement of some of its wooden members with members incorporating the present invention.

In use, the various members may be assembled, as by riveting or welding, to form an all-metal field box, such as is shown in Fig. 1, or they may be substituted for corresponding members in repairing existing wooden field boxes, such as is shown in Fig. 7. This latter feature is one of the principal advantages of the present invention as it permits the owner to purchase only such metal replacement parts as would normally be required to repair his wooden boxes. The replacement members may be nailed in place, as would be necessary with wooden repair members, and the combined wood and metal box may be continued in use until all of the wooden members are replaced, as needed. In this manner, the owner may convert gradually, without additional expense, from the wooden boxes to indestructible boxes that are non-damaging to the produce packed therein.

Although certain specific embodiments of the invention have been shown and described, it is obvious that modifications thereof are possible. The invention, therefore, is not to be restricted except insofar as is necessitated by the prior art and by the spirit of the appended claims.

What is claimed, as new, is:

1. As a manufacture, the parts of a field box including end members and slat members for the sides and for the bottom, each member being prefabricated of thin sheet material, each slat member being provided with rolled longitudinal beaded edges and an intermediate longitudinally extending stiffening rib pressed therein within its area, the rolls and rib lying on the outer side of the slat and the length of the slat, each end member being provided with pressed stiffening ribs within its area and having an inturned rolled upper edge flattened on its top surface and right-angular flanges at side and bottom edges against the outer surface of which the ends of said slat members are to engage, the ends of the slat members and the flanges on the end members being provided with holes adapted to register, when the members are fitted together in box form, to receive fastener elements therethrough, the ends of said bottom slats having depending flanges on their edges and of a width equal to the thickness of the rolls and ribs thereon and adapted to have bearing contact with the flattened top surface of said inturned rolled edge of said end members, when said boxes are stacked one upon the other, whereby said component parts of the metal field box may be substituted for counterparts of a damaged wooden field box which latter may eventuate into an entirely metal box.

2. As a manufacture, the parts of a field box including upper side slat members, integral lower side and bottom slat members, and end members, each member being prefabricated of thin sheet material, each slat member being provided with rolled bead along its free longitudinal edges and flattened at their ends and being further provided with intermediate longitudinally extending stiffening ribs pressed therein with their area and terminating a distance from the ends of the slat, each integral lower side and bottom slat member having a 90° break to form the lower side slat and a bottom slat and a lower longitudinal corner of a box, each end member being provided with pressed stiffening ribs within its area and having an inturned rolled upper edge flattened on its top surface and right-angular flanges at its side and bottom edges, said flanges being adapted to fit flat against the inner faces of the upper side slat members and the integral lower side and bottom slat members, said flanges on said end members and the end portions of the upper side slat and of the lower side and bottom slat members being provided with holes adapted to register, when the members are fitted together in box form, to receive fastener elements therethrough, the ends of the bottom slats of said integral lower side and bottom slat members having depending rectangular flanges formed on the horizontal end edges of a width equal to the thickness of the longitudinal rolls and ribs thereof and adapted to have a smooth bearing contact with the flattened top surface of said inturned rolled edge of said end members, when said boxes are stacked one upon the other.

ROBERT A. FENDER.

REFERENCES CITED

The following references are of record in the file of this patent:

UNITED STATES PATENTS

| Number | Name | Date |
| --- | --- | --- |
| 786,674 | Polski | Apr. 4, 1905 |
| 1,112,943 | Stone | Oct. 6, 1914 |
| 1,185,069 | Currey et al. | May 30, 1916 |
| 1,980,545 | North | Nov. 13, 1934 |
| 2,328,230 | Rosenmund | Aug. 31, 1943 |